US010284738B2

(12) United States Patent
Suzuki

(10) Patent No.: US 10,284,738 B2
(45) Date of Patent: May 7, 2019

(54) IMAGE PROCESSING APPARATUS

(71) Applicant: Konica Minolta, Inc., Tokyo (JP)

(72) Inventor: Takayuki Suzuki, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/902,074

(22) Filed: Feb. 22, 2018

(65) Prior Publication Data

US 2018/0241897 A1 Aug. 23, 2018

(30) Foreign Application Priority Data

Feb. 23, 2017 (JP) .................... 2017-032474

(51) Int. Cl.
*H04N 1/00* (2006.01)
*H04N 1/387* (2006.01)

(52) U.S. Cl.
CPC ....... *H04N 1/00718* (2013.01); *H04N 1/0075* (2013.01); *H04N 1/00734* (2013.01); *H04N 1/00774* (2013.01); *H04N 1/3878* (2013.01)

(58) Field of Classification Search
None
See application file for complete search history.

(56) References Cited

U.S. PATENT DOCUMENTS

| 3,282,191 A * | 11/1966 | Hicks, Jr. | G03B 27/527 355/1 |
| 2005/0012263 A1* | 1/2005 | Koyanagi | B65H 7/10 271/227 |
| 2009/0208065 A1* | 8/2009 | Miura | G06K 9/036 382/112 |
| 2009/0229435 A1* | 9/2009 | Iguchi | B21D 28/26 83/109 |
| 2017/0034392 A1* | 2/2017 | Suga | H04N 1/3875 |
| 2017/0171428 A1* | 6/2017 | Kawano | H04N 1/00718 |

FOREIGN PATENT DOCUMENTS

JP H05-294517 A 11/1993

* cited by examiner

*Primary Examiner* — Fan Zhang
(74) *Attorney, Agent, or Firm* — Osha Liang LLP

(57) ABSTRACT

An image processing apparatus includes: a conveyance unit configured to convey a medium; a sensor configured to sense a medium being conveyed; and a controller configured to control the conveyance unit and acquire a result of the sensing performed by the sensor. The sensor includes a light emitter, a light receiver configured to perform output in accordance with the amount of the received light, and a shielding unit including a transmissive part through which the sensing light transmits. The transmissive part has a shape in which an opening width in a direction orthogonal to a conveyance direction of the medium changes in the conveyance direction. The controller determines skewing of the medium being conveyed based on change in the amount of light received by the light receiver as the medium passes along the transmissive part and temporal change in accordance with the conveyance of the medium.

10 Claims, 16 Drawing Sheets

IMAGE PROCESSING APPARATUS

CROSS-REFERENCE TO RELATED APPLICATIONS

The entire disclosure of Japanese patent Application No. 2017-032474, filed on Feb. 23, 2017, is incorporated herein by reference in its entirety.

BACKGROUND

Technical Field

The present invention relates to an image processing apparatus configured to convey a medium relating to image processing.

Description of the Related Art

In the fields of image forming devices, image reading devices, and the like, a sheet onto which an image is to be transferred and a sheet on which an image is printed are conveyed to perform image formation and image reading thereon. To achieve the conveyance, conveyance rollers capable of sandwiching both surfaces of a sheet are disposed along a conveyance path on which the sheet is conveyed. Rotation of one or both of conveyance rollers positioned on both surface sides of the sheet causes the sheet to be conveyed. However, the sheet is obliquely conveyed in some cases depending on, for example, a state in which the sheet is set or ununiform pressure applied on the sheet by the conveyance rollers.

In a conventional method for this skewing, a plurality of sensors configured to sense the skew angle of the sheet are provided before image formation and image reading to sense the skew angle of the sheet before image reading and printing. Then, skewing of the sheet is corrected based on a result of the sensing, or an image is corrected in accordance with skewing of the sheet.

A plurality of sensors configured to sense the skew angle of a sheet are provided on the conveyance path of the sheet in a direction orthogonal to the conveyance direction of the sheet to sense skewing of the sheet and the angle thereof based on the difference between timings at which the sensors sense the leading end of the sheet.

For example, in the invention disclosed in Japanese Patent Laid-open No. 5-294517, photo sensors are provided on a line orthogonal to a direction in which a print medium is taken in to measure the difference between timings at which the sensors actuate, thereby calculating the amount of skewing of the sheet based on the difference and the conveyance speed of the sheet.

In the disclosure of Japanese Patent Laid-open No. 5-294517, two photo sensors are used to sense skewing of a sheet. However, characteristics vary between a plurality of devices of an identical product in some case, which leads to variance in the timing measurement and thus degradation of measurement accuracy. In addition, it is essential to provide a plurality of sensors, which leads to higher cost than expected.

SUMMARY

The present invention is intended to solve the above-described problem by providing an image processing apparatus capable of accurately detecting skewing of a recording medium being conveyed.

An image processing apparatus of one or more embodiments of the present invention includes: a conveyance unit configured to convey a medium relating to image processing along a conveyance path; a sensor configured to sense the medium conveyed along the conveyance path; and a controller configured to control the conveyance unit and acquire a result of the sensing performed by the sensor. The sensor includes a light emitter, a light receiver configured to receive sensing light output from the light emitter and perform output in accordance with the amount of the received light, and a shielding unit including a transmissive part through which the sensing light output from the light emitter and reaching at the light receiver transmits. The transmissive part has a shape in which an opening width in a direction orthogonal to conveyance direction of the medium changes in the conveyance direction. The shielding unit is disposed at a position through which the medium being positioned between the light emitter and the light receiver and conveyed along the conveyance path passes along the transmissive part. The controller determines skewing of the medium being conveyed based on change in the amount of light received by the light receiver as the medium passes along the transmissive part and temporal change in accordance with the conveyance of the medium.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

An image processing apparatus according to one or more embodiments of the present invention will be described below with reference to the accompanying drawings.

Figure 1:
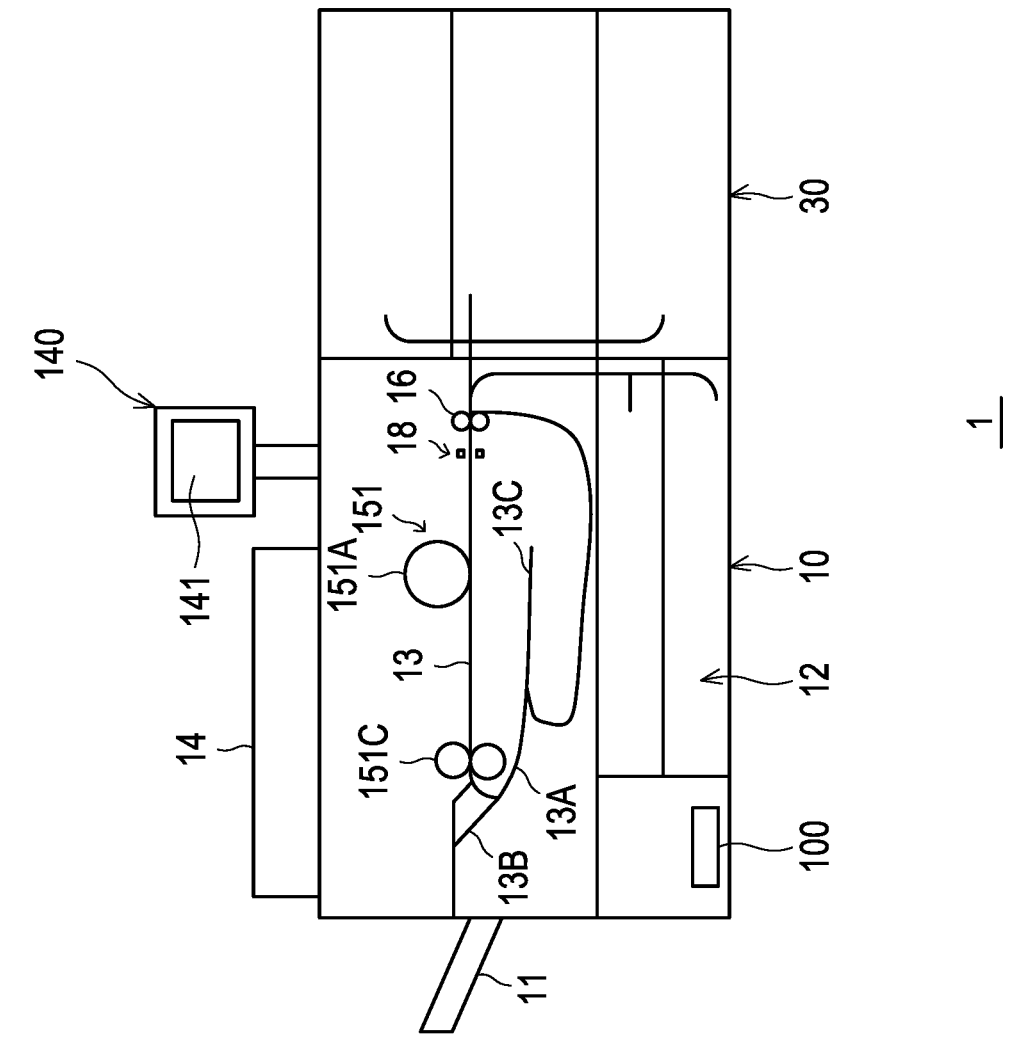
FIG. 1 is a diagram schematically illustrating a mechanical configuration of an image forming device as an image processing apparatus according to one or more embodiments of the present invention.

FIG. 1 is a diagram schematically illustrating a mechanical configuration of an image forming device 1 as the image processing apparatus according to one or more embodiments of the present invention.

The image forming device 1 includes a feeding device 30, and a device body 10 positioned downstream of the feeding device 30 and connected therewith. The feeding device 30 and the device body 10 are mechanically and electrically connected with each other to achieve sheet conveyance and communication between the feeding device 30 and the device body 10.

The configuration of the image forming device according to the present invention is not limited to the above-described configuration. The image forming device may be achieved by the device body 10 only or may further include another device.

The feeding device 30 includes a plurality of feeding trays each housing sheets. A sheet corresponds to a medium according to one or more embodiments of the present invention. In one or more embodiments of the present invention, the material of the medium is not limited to paper, but may be plastic or fabric. Continuous recording media such as a continuous sheet and a continuous stationery sheet may be used.

The sheets housed in the feeding device 30 can be supplied into a conveyance path of the device body 10.

The device body 10 includes this conveyance path 13. The conveyance path 13 has an upstream side connected with the feeding device 30.

A conveyance roller 16 (collectively referring to a plurality of conveyance rollers) is provided along the conveyance path 13. A sheet is conveyed as the conveyance roller 16 rotates while sandwiching the sheet. The conveyance roller 16 is driven by, for example, a motor (not illustrated).

A body feeding unit 12 is provided on lower side in the device body 10. The body feeding unit 12 includes a plurality of feeding trays each housing sheets. A sheet corresponds to a medium according to one or more embodiments of the present invention. The sheets in the body feeding unit 12 are fed onto the conveyance path 13.

The device body 10 is provided with a document reading unit (document reader) 14 above a housing thereof. The document reading unit 14 can read a document image. In the document reading unit 14, a document can be set to a document feeding unit configured to perform document feeding so that sheet reading is performed, and a document can be set on a platen glass so that sheet reading is performed by a scanner unit (not illustrated).

An operation unit 140 is provided above the housing of the device body 10. The operation unit 140 includes an LCD 141 provided with a touch panel. Information display and reception of an operation input can be performed on the LCD 141. The operation unit 140 may be configured by, for example, a mouse and a keyboard, and separately provided from a display unit.

A sensor 18 is provided halfway through the conveyance path 13 described above. The sensor 18 includes a light emitting element 18A positioned above the conveyance path 13, and a light receiving element 18B positioned below the conveyance path 13 (illustrated in FIG. 3). The light receiving element 18B is provided at a position facing to the light emitting element 18A. In the sensor 18, the light receiving element 18B receives sensing light output from the light emitting element 18A. The light receiving element 18B outputs an electric signal in accordance with the amount of the received light in an analog manner. The light emitting element corresponds to a light emitter according to one or more embodiments of the present invention, and the light receiving element corresponds to a light receiver according to one or more embodiments of the present invention.

As a sheet being conveyed passes between the light emitting element 18A and the light receiving element 18B of the sensor 18, the amount of received light of sensing light output from the light emitting element 18A and received by the light receiving element 18B changes, and an output from the light receiving element 18B changes accordingly. The leading end of the conveyed sheet can be sensed based on a change in the output from the light receiving element 18B. Details of the sensor will be described later.

An image formation unit (image former) 151 is provided downstream of the sensor 18 halfway through the conveyance path 13. The image formation unit 151 includes a photoreceptor 151A. An electric charger, an LD, and a development unit (not illustrated) are provided around the photoreceptor 151A. A transfer device (not illustrated) is provided downstream of the photoreceptor 151A.

In the image formation unit 151, a latent image is formed, by the LD, on the photoreceptor 151A uniformly charged by the electric charger. The latent image is developed into a toner image by the development unit. The toner image is transferred onto a sheet by the transfer device. The transferred toner image is fixed through heat and pressure application by a fixing device 151C. Through this series of operation, an image can be formed on a sheet by an electrophotographic scheme. Any toner material remaining on the photoreceptor 151A is removed by a cleaning unit (not illustrated). The sheet on which an image is formed is applied with heat and pressure by the fixing device 151C to fix the image. The timing of the image formation can be determined based on leading end sensing performed by the sensor 18.

Although FIG. 1 illustrates the image forming device configured to form an image by the electrophotographic scheme, the present invention is not limited to a particular image formation method, but may employ a desired method such as an ink jet method. Although the above embodiments describe the image forming device of a single color, the present invention is applicable to an image forming device configured to perform multicolor printing.

The conveyance path 13 bifurcates, downstream of the fixing device 151C, into a straight downstream part of the conveyance path 13 and an inversion conveyance path 13A.

An inversion path 13B bifurcates halfway through the inversion conveyance path 13A. The inversion path 13B has a downstream side joined with the conveyance path 13 downstream of a position at which the inversion path 13B bifurcates.

The inversion conveyance path 13A includes an inversion part 13C downstream of the position at which the inversion path 13B bifurcates. The inversion part 13C allows reciprocation of a sheet. The inversion conveyance path 13A has a further downstream side joined with the conveyance path 13 upstream of the image formation unit 151. The conveyance path 13 is connected with a discharging tray 11 downstream thereof.

When an image is formed on the back surface of a sheet, the sheet on which the image is formed is conveyed onto the inversion conveyance path 13A and entirely fed to the inversion part 13C. Then, the sheet is conveyed in the opposite direction and transferred to the downstream side of the inversion conveyance path 13A. Through this operation, the front and rear sides of the sheet are interchanged and the front and back surfaces thereof are inverted. The inverted sheet is returned onto the conveyance path 13 to perform leading end sensing at the sensor 18 and image formation on the back surface at the image formation unit 151.

When a sheet is fed onto the inversion conveyance path 13A not to perform printing on the back surface of the sheet, the sheet is conveyed onto the inversion conveyance path 13A, and then reversed at a position after the position at which the inversion path 13B bifurcates, so that the sheet is fed onto the inversion path 13B. Then, the sheet is returned onto the conveyance path 13 and conveyed toward the downstream side. In this manner, the front and rear sides of the sheet are interchanged and the front and back surfaces thereof are inverted.

When a sheet is not to be inverted, the sheet is conveyed straight along the conveyance path 13. The downstream end of the conveyance path 13 is connected with the discharging tray 11.

The device body 10 includes a control unit 100 configured to control the image forming device 1. The control unit 100 includes a CPU, a computer program that operates on the CPU, and a storage unit.

Figure 2:
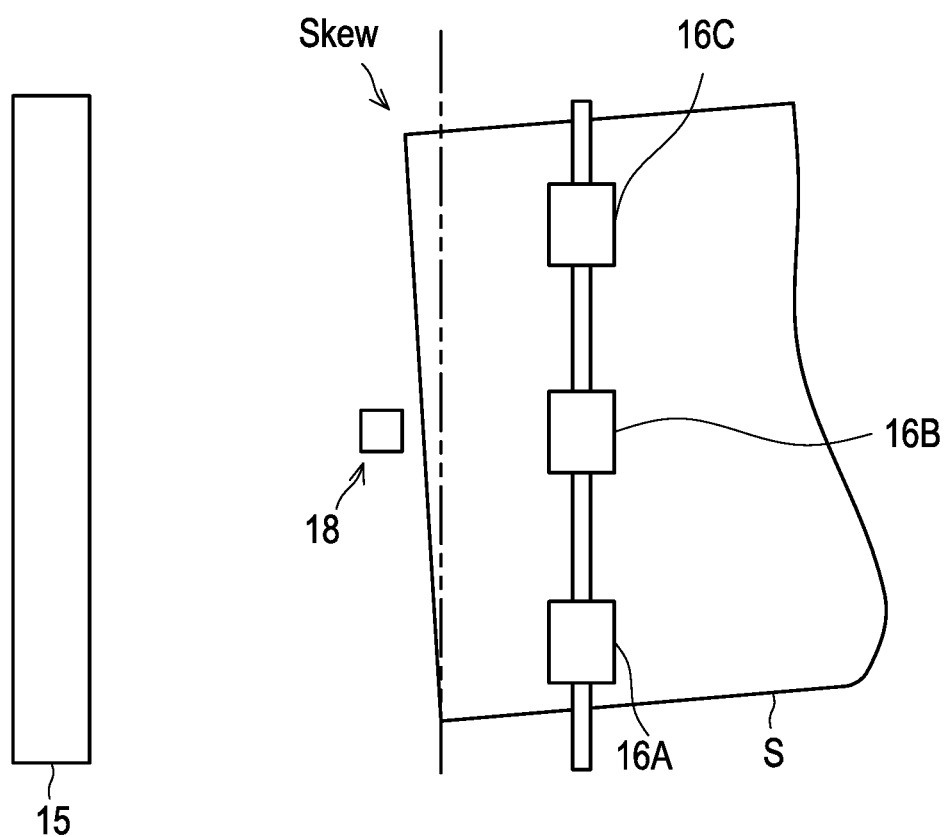
FIG. 2 is a plan view of the vicinity of a sensor according to one or more embodiments of the present invention.
Figure 3:
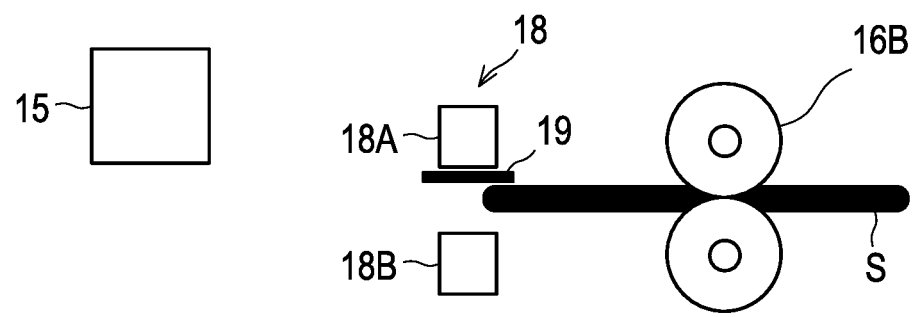
FIG. 3 is a side view of the vicinity of the sensor according to one or more embodiments of the present invention.

Details of the sensor 18 will be described below with reference to FIGS. 2 to 4.

Conveyance rollers 16A, 16B, and 16C are provided upstream of a print head 15 used for image formation and are fastened rotatable by rotational shafts orthogonal to the conveyance direction. The sensor 18 is disposed immediately downstream of the conveyance rollers 16A, 16B, and 16C. As illustrated in FIG. 3, the sensor 18 is positioned downstream of the conveyance roller 16B in the conveyance direction of a sheet. The conveyance roller 16B is positioned at a central position of a sheet and conveys the sheet at the center of the sheet irrespective of the size of the sheet.

The sensor 18 includes the light emitting element 18A positioned above a sheet S being conveyed and configured to output sensing light downward, and the light receiving element 18B positioned below the sheet S being conveyed and directly below the light emitting element 18A and configured to receive the sensing light emitted from above. The vertical positions of the light emitting element and the light receiving element may be interchanged. As illustrated in FIG. 3, a shielding plate 19 is disposed between the sheet S being conveyed and the light emitting element 18A. The shielding plate 19 corresponds to a shielding unit (shield) according to one or more embodiments of the present invention. The shielding unit does not need to have a plate shape, but may have a block shape.

Figure 4:
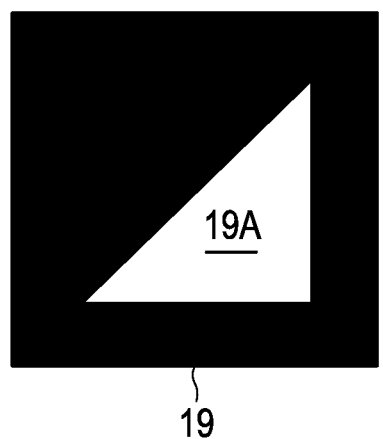
FIG. 4 is a diagram illustrating a shielding plate provided on an optical path of the sensor according to one or more embodiments of the present invention.

As illustrated in FIG. 4, the shielding plate 19 has a black plate having an opening 19A inside. The opening 19A is shaped in an isosceles right triangle. The base of the isosceles right triangle is aligned with a direction orthogonal to the conveyance direction. A side of the isosceles right triangle, which is angled at 90° with respect to the base, is aligned with the conveyance direction on the left side with respect to the conveyance direction, and an apex is positioned at the leading end of the side. Accordingly, a side on the right side with respect to the conveyance direction is tilted to the left to form an internal angle of 45°. Such arrangement is possible that the side orthogonal to the base is positioned on the right side. Light emitted from the light emitting element and passing through the opening 19A reaches at the light receiving element 18B, whereas the remaining of the emitted light is blocked by the black plate.

In the opening 19A shaped in the above-described right triangle, the opening area of light transmission changes due to the tilt of the right side as a sheet is conveyed, which allows simplification of change in the amount of received light. The skew angle of the sheet can be calculated by a simple formula.

The opening corresponds to a transmissive part according to one or more embodiments of the present invention. The transmissive part may be opened or made of a transmissive material, and thus does not need to be opened.

The shape of the transmissive part is not limited to a right triangular shape. A triangle or a polygon may be disposed so that one apex thereof is positioned downstream in the conveyance direction. In such a case, a side upstream in the conveyance direction is desirably aligned with the direction orthogonal to the conveyance direction.

The shape of the transmissive part is not limited to the above-described triangle and polygon. The transmissive part may have a shape in which the width of the opening in the direction orthogonal to the conveyance direction changes in the conveyance direction of a sheet. With this configuration, the relation between change in the amount of light received by the light receiving element 18B and temporal change in accordance with sheet conveyance differs between a skewing sheet and a sheet without skewing. Accordingly, the skew angle can be calculated based on the relation. The skew angle may be obtained by referring to a table which is acquired in advance and indicates, for example, the relation between change in the amount of received light and the speed of conveyance, or may be obtained by calculation.

When the transmissive part has a shape that is symmetric on the right and left sides with respect to the conveyance direction, it is impossible to determine whether skewing is occurring on the right side or the left side. Thus, the transmissive part desirably has a shape that is asymmetric on the right and left sides with respect to the conveyance direction. However, when a tilt angle is not obtained by a single sensor or when a tilt direction is not determined, the transmissive part may have a shape that is symmetric on the right and left sides with respect to the conveyance direction.

Figure 5:
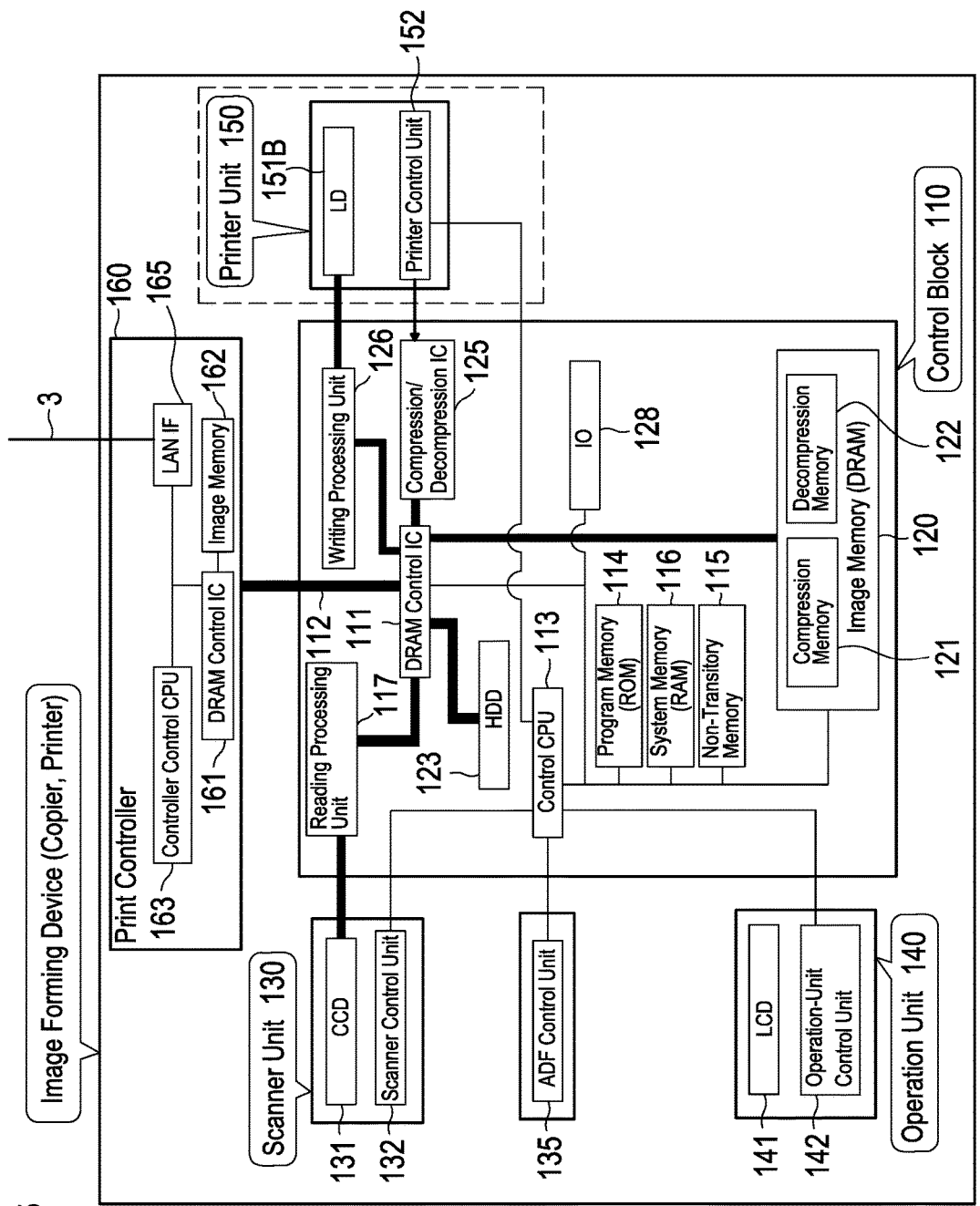
FIG. 5 is a functional block diagram according to one or more embodiments of the present invention.

The following describes a functional configuration of the image forming device 1 with reference to a block diagram illustrated in FIG. 5.

The image forming device 1 mainly includes a control block 110, a scanner unit 130, the operation unit 140, a printer unit 150, and a print controller 160.

The control block 110 includes a PCI bus 112 connected with the print controller 160. The PCI bus 112 is also connected with a DRAM control IC 111. The DRAM control IC 111 is connected with an image memory (DRAM) 120. The image memory (DRAM) 120 includes a compression memory 121 configured to store compressed image data, and a decompression memory 122 configured to temporarily store, before image formation, non-compressed image data to be printed.

The DRAM control IC 111 is connected with a hard disk (HDD) unit 123. The hard disk (HDD) unit 123 stores, for example, image data acquired by the scanner unit 130 and image data acquired by the print controller 160.

Image data acquired by the print controller 160 and image data stored in the hard disk (HDD) unit 123 are transmitted to the DRAM control IC 111 through the PCI bus 112 in response to a print operation.

The control block 110 includes a control CPU 113. The control CPU 113 is connected with the DRAM control IC 111.

The control CPU 113 is connected with a program memory (ROM) 114, a system memory (RAM) 116, and a non-transitory memory 115. The program memory (ROM) 114 is achieved by a ROM and stores, for example, a computer program for operating the control CPU 113. The system memory (RAM) 116 is achieved by a RAM and used as, for example, a work area. The non-transitory memory 115 is achieved by, for example, a flash memory.

The non-transitory memory 115 stores information on initial setting of the device body 10, machine setting information such as a process control parameter, postprocessing setting, sheet information data, tray setting information, and setting information such as a skew angle calculation table for a result of sensing performed by the sensor and a calculation formula.

The control CPU 113 is capable of reading non-transitory data from the non-transitory memory 115 and writing desired data to the non-transitory memory 115.

Predetermined operations of the control CPU 113 are executed by the computer program stored in the program memory (ROM) 114. The control CPU 113 controls operations of the device body 10 and each component of a postprocessing device, if any, in accordance with, for example, the above-described machine setting information, printing setting information, and output setting.

The control CPU 113 together with, for example, the program memory (ROM) 114, the system memory (RAM) 116, and the non-transitory memory 115 configures the control unit 100 as a controller according to one or more embodiments of the present invention, and can control, for example, execution of a job including sheet conveyance, and determination of the skew angle of a sheet.

The scanner unit 130 includes a CCD 131 configured to perform optical reading, and a scanner control unit 132 configured to control the entire scanner unit 130. The scanner control unit 132 is connected with the control CPU 113 to perform serial communication therebetween. The CCD 131 is connected with a reading processing unit 117. The reading processing unit 117 is connected with the DRAM control IC 111 in a controllable manner.

The reading processing unit 117 processes image data read by the CCD 131. For example, the reading processing unit 117 generates digital image data by providing an analog image signal input from the CCD 131 with various kinds of processing such as analog signal processing, analog to digital (A/D) conversion processing, and shading processing, and outputs the digital image data to a compression/decompression IC 125.

The control CPU 113 is connected with an ADF control unit 135 in a controllable manner. The ADF control unit 135 controls a continuous-type automatic document feeder (ADF) 14.

The scanner unit 130 reads images of a document placed on the platen glass above the device body 10 and a document automatically conveyed by the document reading unit 14. The document reading unit 14 may include a continuous-type automatic document feeder (ADF).

The operation unit 140 includes the LCD 141 provided with the touch panel, and an operation-unit control unit 142 configured to control the entire operation unit. The operation unit 140 functions as an operation unit and a display unit. The operation-unit control unit 142 is connected with the control CPU 113 to perform serial communication therebetween.

The operation unit 140 can receive through the LCD 141, by control of the control CPU 113, outputting condition setting of the device body 10, inputting of machine setting such as an operation control condition, input of setting of sheet information (size and paper type) on each feeding tray, postprocessing setting.

The DRAM control IC 111 is connected with the compression/decompression IC 125 capable of compressing or decompressing image data. The DRAM control IC 111 controls image data compression processing and compressed image data decompression processing by the compression/decompression IC 125 in accordance with an instruction from the control CPU 113, and also controls inputting and outputting of image data to and from the image memory (DRAM) 120.

The DRAM control IC 111 is connected with a writing processing unit 126. The writing processing unit 126 is connected with the image formation unit 151 including the LD 151B of the printer unit 150, and generates, based on image data, writing data to be used for operation of the LD 151B.

The printer unit 150 includes a printer control unit 152. The printer control unit 152 is connected with the control CPU 113 to perform serial communication therebetween. The printer control unit 152 operates in accordance with a control command from the control CPU 113, and performs, for example, sheet conveyance and image formation by controlling the entire operation (such as feeding, image formation, sheet conveyance, paper discharge destination switching, and postprocessing) of the printer unit 150. The printer control unit 152 can instruct the compression/decompression IC 125 to decompress compressed image data.

The PCI bus 112 is connected with a DRAM control IC 161 of the print controller 160. When the device body 10 is used as a network printer or a network scanner, the print controller 160 controls the device body 10 to receive, for example, image data from a terminal or the like connected with a network 3, and transmits image data acquired by the scanner unit 130 to a terminal or the like connected with the network 3.

The print controller 160 can perform communication with a terminal PC or the like through the network. For example, the print controller 160 is capable of receiving and processing image data input from the terminal PC or the like, or forwarding image data acquired by the scanner unit 130 to the terminal PC or the like through the network.

The DRAM control IC 161 of the print controller 160 is connected with an image memory 162 including a DRAM. In the print controller 160, the DRAM control IC 161, a controller control CPU 163 configured to control the entire print controller 160, and a LAN interface 165 are connected with a common bus. The LAN interface 165 is connected with the network 3.

The control CPU 113 is connected with an IO 128. The IO 128 can communicate signals with various sensors and the like inside and outside of the image forming device 1, and for example, can transmit a control signal to the sensor 18 and acquire a sensing result from the sensor 18. The control CPU 113 can acquire the sensing result from the sensor 18 and calculate the skew angle of a sheet.

The following describes a basic operation the image forming device 1 described above.

First, description will be made of a procedure of accumulating image data in the image forming device 1.

The following describes a case in which an image is read by the scanner unit 130 to generate image data in the image forming device 1. First, an image of a document is optically read by the CCD 131 of the scanner unit 130. Specifically, the control CPU 113 issues a command to the scanner control unit 132 to perform operation control of the CCD 131 by the scanner control unit 132. The document reading may be performed by the document reading unit 14 while documents are being fed by a continuous-type automatic document feeder (ADF) or may be performed by placing each document on the platen glass. The control CPU 113 operates in accordance with a computer program and issue a command to the scanner unit 130 based on an operation through the operation unit 140.

The image read by the CCD 131 is provided with data processing at the reading processing unit 117. The processed image data is then transferred to the compression/decompression IC 125 through the DRAM control IC 111 and compressed by a predetermined method. The compressed data is stored in the compression memory 121 through the DRAM control IC 111. When the compressed data is to be stored in the hard disk (HDD) unit 123, the compressed data is temporarily stored in the compression memory 121 and then transferred to the hard disk (HDD) unit 123 through the DRAM control IC 111.

Alternatively, the image data can be input to the image forming device 1 through the network 3. Examples of the above-described image data include image data generated by, for example, an application program on a terminal or the like, and image data generated by another image forming device. Such image data is received by the print controller 160 through the network 3 and the LAN interface 165 and temporarily stored in the image memory 162 by the DRAM control IC 161. The data stored in the image memory 162 is forwarded to the DRAM control IC 111 through the PCI bus 112 and temporarily stored in the decompression memory 122. The data stored in the decompression memory 122 is transferred to the compression/decompression IC 125 through the DRAM control IC 111, provided with compression processing there, and stored in the compression memory 121 through the DRAM control IC 111. When the data is to be stored in the hard disk (HDD) unit 123, the data is temporarily stored in the compression memory 121 and then transferred to the hard disk (HDD) unit 123 through the DRAM control IC 111.

Subsequently, when image output is to be performed by the image forming device 1, the data stored in the hard disk (HDD) unit 123 is temporarily stored in the compression memory 121 through the DRAM control IC 111. The data stored in the compression memory 121 is sent to the compression/decompression IC 125 through the DRAM control IC 111 and decompressed. The decompressed data is sent to the writing processing unit 126 through the DRAM control IC 111 to generate writing data. Then, writing is performed to the photoreceptor at the LD 151B.

Having received a command from the control CPU 113, the printer control unit 152 of the printer unit 150 controls components such as the body feeding unit 12 and the conveyance path 13. The printer unit 150 sequentially performs, for example, image formation, transfer to a sheet, fixation, and conveyance through the conveyance path, and then performs printing output.

The following describes change in an output from the light receiving element 18B as a sheet is conveyed.

Figure 6:
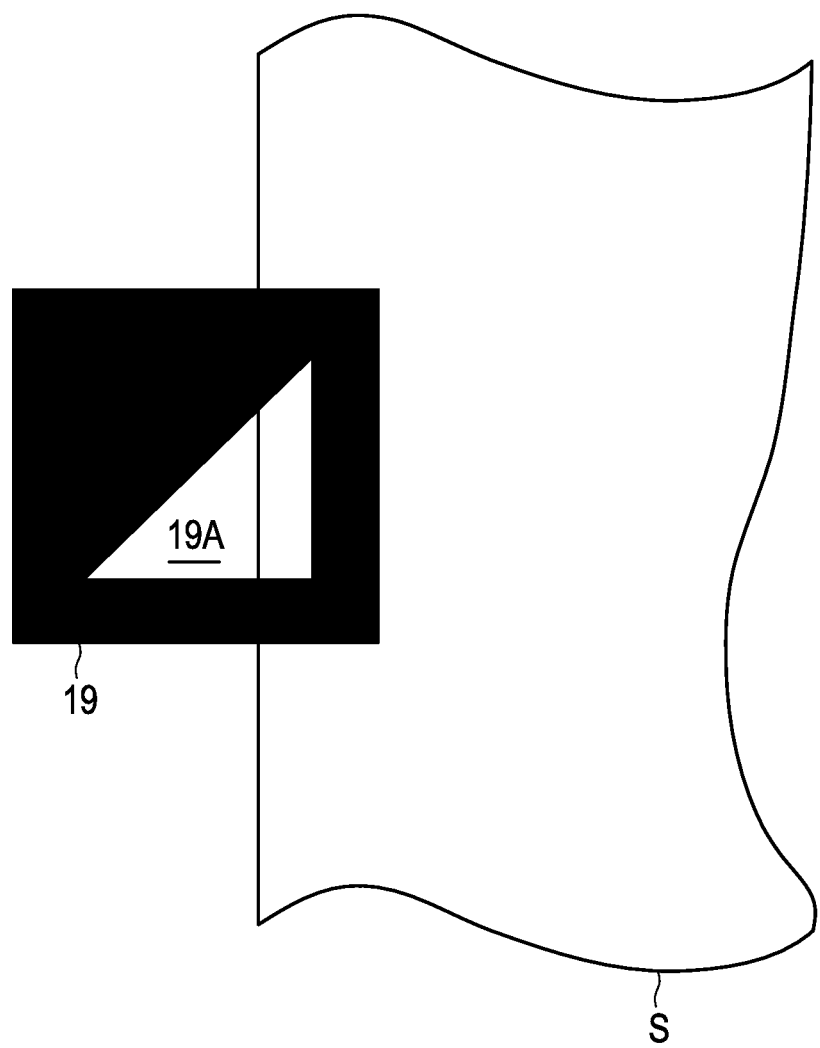
FIG. 6 is a diagram illustrating a state in which a sheet conveyed without skewing passes through an opening according to one or more embodiments of the present invention.

FIG. 6 illustrates a state in which a sheet is conveyed without skewing, moving along the shielding plate 19.

When a sheet is being conveyed without skewing, an edge of the sheet at the leading end and the base of the opening 19A are maintained in parallel to each other. When the sheet is moving along the shielding plate 19, the leading end of the sheet reaches at the opening 19A and blocks light from the light emitting element, and thus the amount of light input to the light receiving element gradually decreases.

Figure 7:
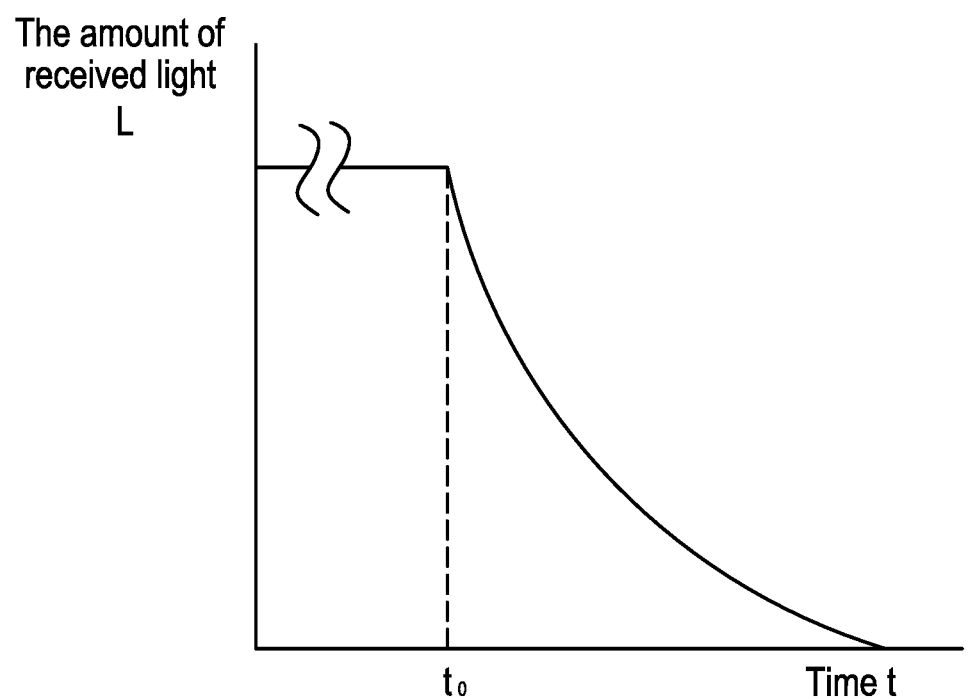
FIG. 7 is a graph illustrating change in the amount of received light when a sheet is conveyed without skewing according to one or more embodiments of the present invention.

FIG. 7 illustrates temporal change in the amount of received light in this case. When the sheet S is yet to reach, the amount of light passing through the opening 19A is constant, and thus the amount of light indicates a constant value. Then, when the leading end of the sheet S reaches at the opening (time to), the amount of received light decreases with elapsed time. At time t (time elapsed since $t_0$), the opening 19A is entirely blocked by the sheet, and thus the amount of received light is zero.

For example, when l represents the length of the side of the opening in the conveyance direction, v represents the conveyance speed of a sheet, and s represents the area of the transmissive part, the following formula is obtained.

$$s = \tfrac{1}{2}*(1-vt)^2 \qquad (1)$$

Figure 8:
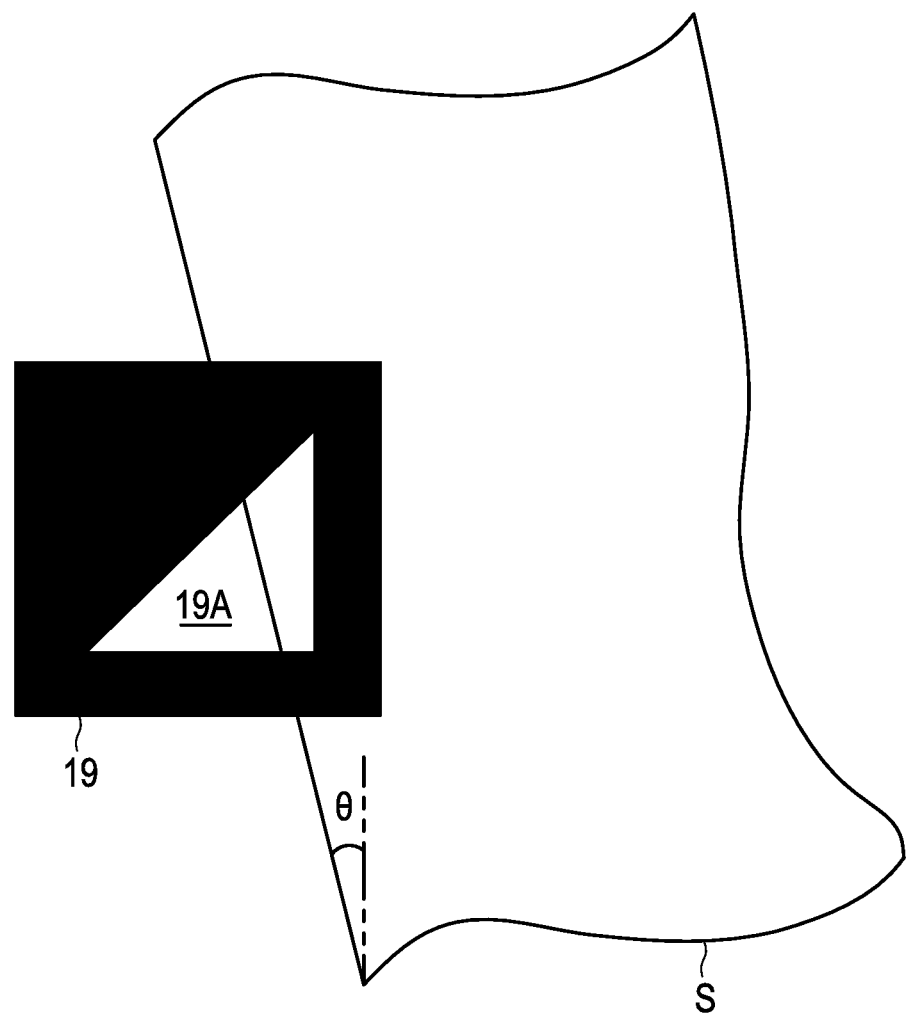
FIG. 8 is a diagram illustrating a state in which a sheet skewing while being tilted to the left with respect to a conveyance direction passes through the opening according to one or more embodiments of the present invention.
Figure 9:
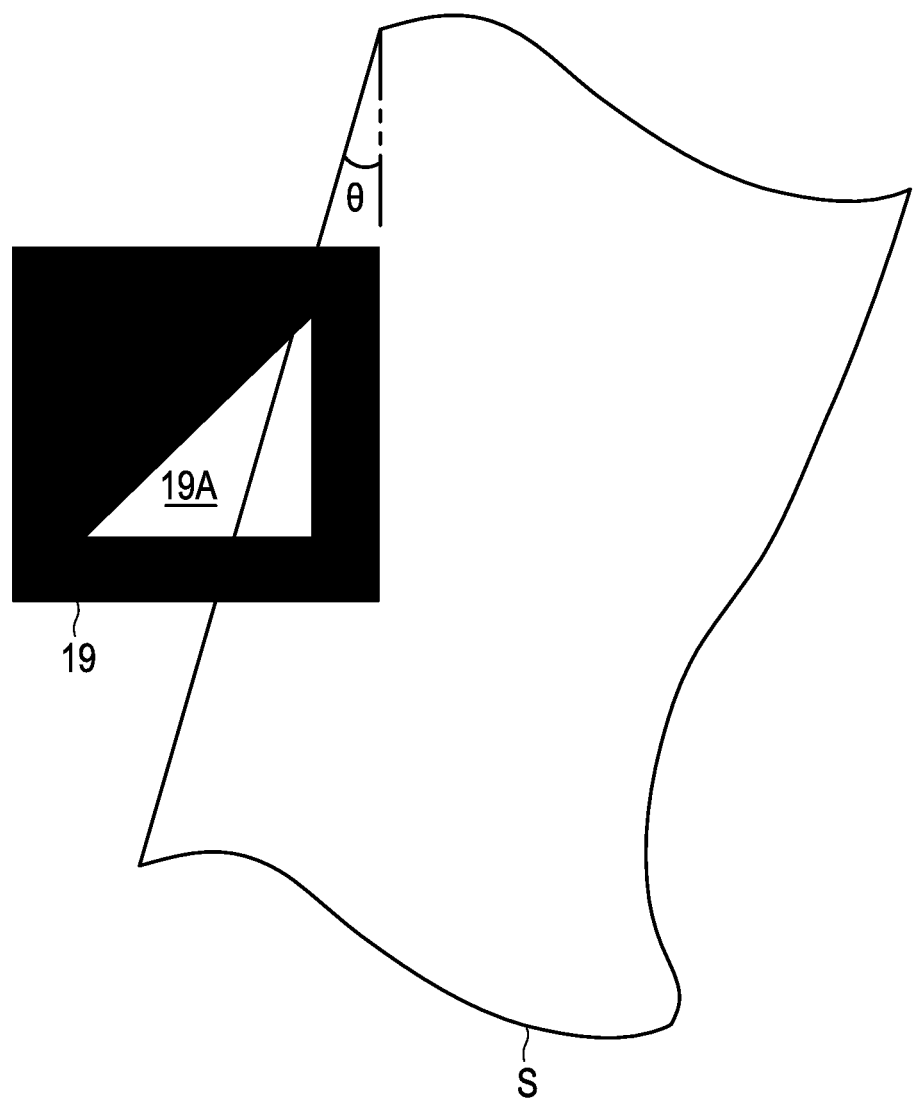
FIG. 9 is a diagram illustrating a state in which a sheet skewing being tilted to the right with respect to the conveyance direction passes through the opening according to one or more embodiments of the present invention.

FIGS. 8 and 9 each illustrate a state in which the sheet S is conveyed while skewing with respect to the shielding plate 19.

In FIG. 8, the sheet S is conveyed while skewing being tilted to the left with respect to the conveyance direction. In FIG. 9, the sheet S is conveyed while skewing being tilted to the right with respect to the conveyance direction.

When the sheet is conveyed while skewing, the relation between the elapsed time and change in the transmissive area of the opening is different from that in a case without skewing, and this difference further differs with the skew angle.

For example, as compared to a case of the sheet without skewing, a longer time elapses until the leading end of the sheet passes through the opening 19A when the sheet skews while being tilted to the left as illustrated in FIG. 8, or a shorter time elapses until the leading end of the sheet passes through the opening when the sheet skews while being tilted to the right as illustrated in FIG. 9. Since the relation between the elapsed time and the opening area of the opening differs depending on the shape of the opening, the present invention is not limited to the above-described relation.

In one or more embodiments of the present invention, the skew angle of a sheet is calculated based on the relation between the amount of light received by the light receiving element 18B and the elapsed time.

The following first describes the example illustrated in FIG. 8, in which the sheet skews while being tilted to the left. In the following description, the opening is shaped in an isosceles right triangle. Among the apexes of the triangle, the right-angled apex is denoted by C. Among the two remaining apexes, an apex positioned upstream in the conveyance direction of a sheet is denoted by A, and an apex positioned downstream in the conveyance direction is denoted by B.

When a sheet skews while being tilted to the left, the leading end of the sheet reaches at the apex A, the apex C, and the apex B in this order. Accordingly, as compared to a case of a sheet without skewing, a longer time elapses until the sheet completely covers the opening 19A. Thus, the skew angle of the sheet can be obtained based on a continuation time in which the amount of received light continuously changes.

When T1 represents the continuation time as a duration in which the amount of received light changes, l represents the length of each of the right-angled sides of the triangle of the transmissive part, v represents the conveyance speed of a sheet, and θ represents the tilt angle of the sheet, the continuation time T1 is expressed in the following formula.

$$T1=l/v*(1+\tan\theta) \quad (2)$$

Thus, the tilt angle θ of the sheet can be obtained by calculating the continuation time T1 through analysis of a signal output from the light receiving element and substituting the calculated continuation time T1 into the above-described formula.

Figure 10:
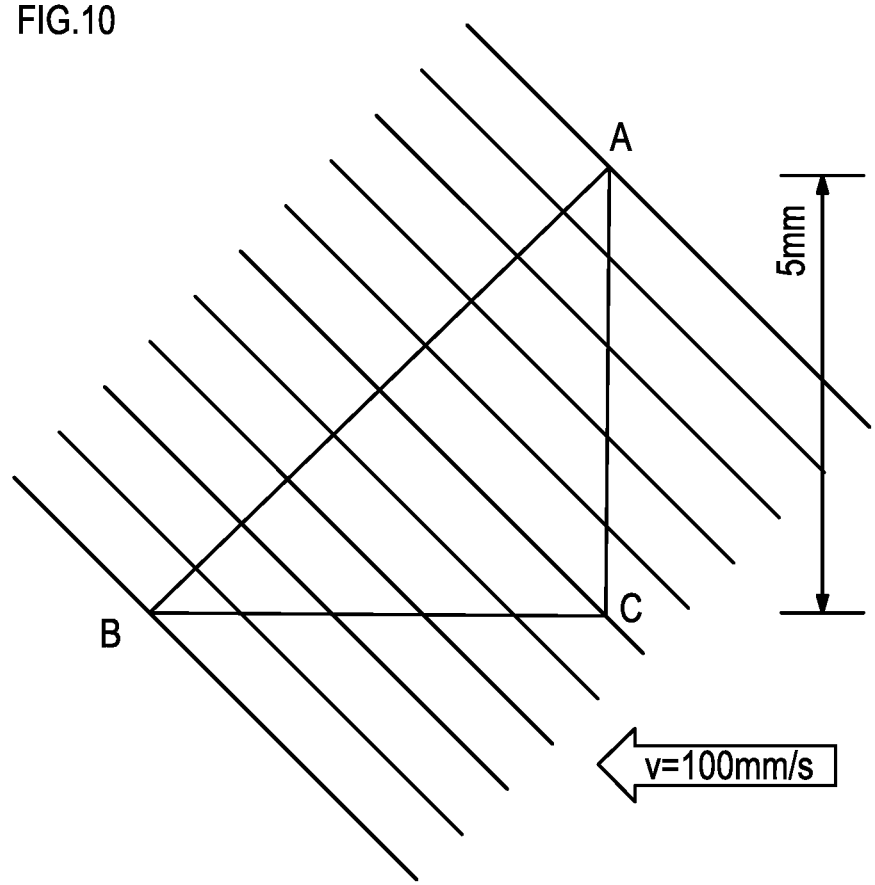
FIG. 10 is a diagram illustrating a situation when a sheet skewing at an angle of 45° to the left with respect to the conveyance direction passes through the opening according to one or more embodiments of the present invention.

FIG. 10 illustrates the state of a sheet being conveyed in a specific example with the tilt angle θ=45°, l=5 mm, and v=100 mm/s FIG. 10 virtually illustrates the position of the edge of the leading end of the sheet moving at each 10 ms.

Figure 11:
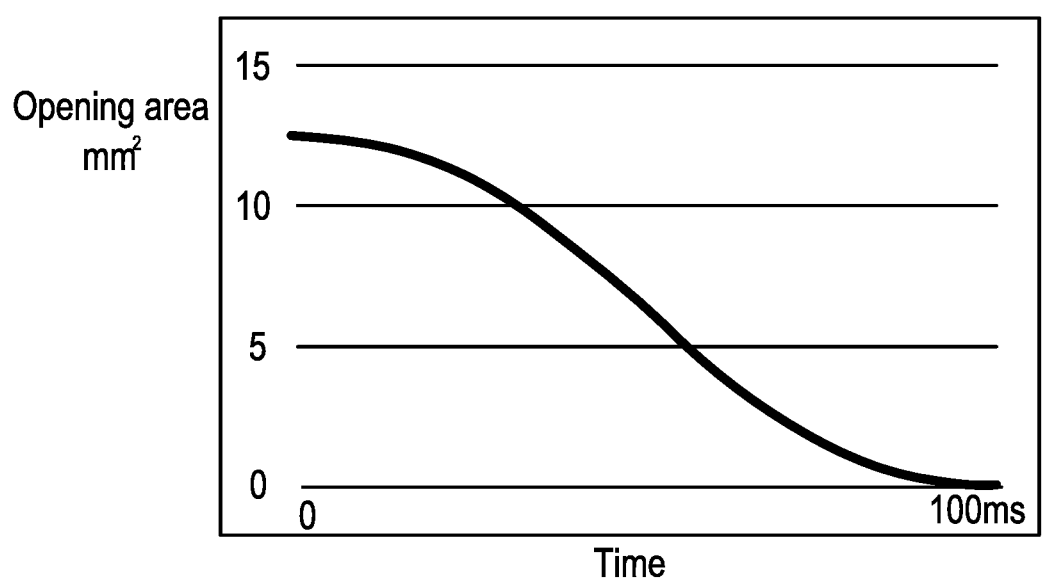
FIG. 11 is a graph illustrating change in the opening area as a sheet skewing at an angle of 45° to the left with respect to the conveyance direction passes through the opening according to one or more embodiments of the present invention.

FIG. 11 illustrates temporal change in the opening area in FIG. 10. Change in the opening area can be thought as change in the amount of received light. In FIG. 11, a time when the leading end of the sheet reaches at the opening is set to be zero.

In the example illustrated in FIG. 10, the leading end of the sheet reaches at the apex C and the apex B after the apex A. Accordingly, as illustrated in FIG. 11, the amount of light received by the light receiving element 18B changes in an upwardly convex shape in the first half, and changes in a downwardly convex shape in the second half. The amount of received light continuously changes for 100 ms. When the sheet does not skew, 50 ms elapses until the sheet reaches at the apex A since the sheet reaches at the apex C. Thus, the continuation time in which the amount of received light continuously changes is longer as compared to a case of a sheet without skewing.

In this manner, the control unit 100 can calculate the skew angle of a sheet by calculating a continuation time in which the output changes based on a signal output from the light receiving element and substituting the calculated continuation time into the above-described formula.

The following describes a case in which a sheet skews while being tilted to the right.

Figure 12:
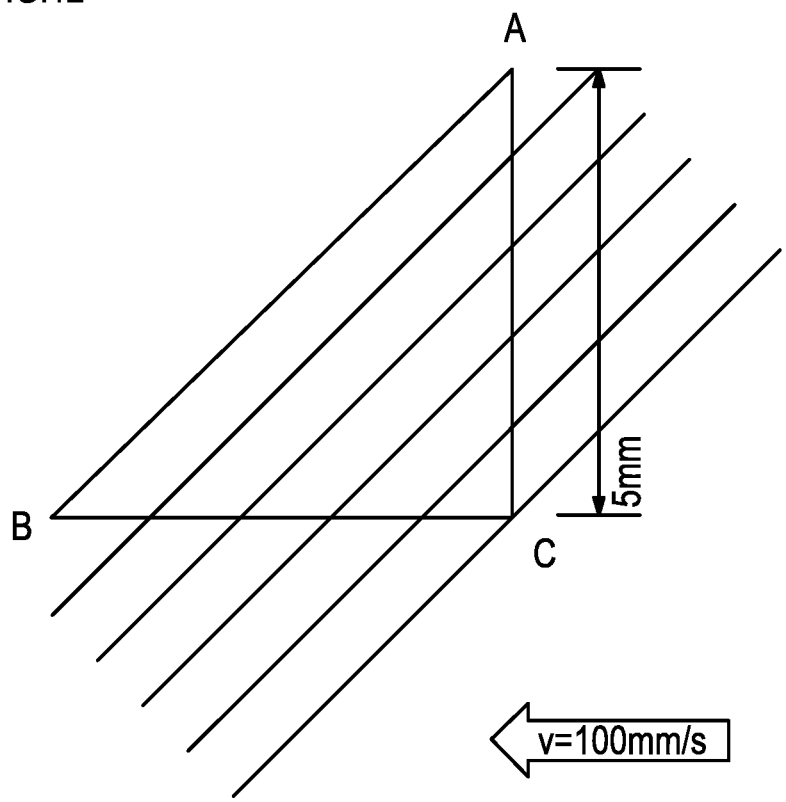
FIG. 12 is a diagram illustrating a situation when a sheet skewing at an angle of 45° to the right with respect to the conveyance direction passes through the opening according to one or more embodiments of the present invention.
Figure 13:
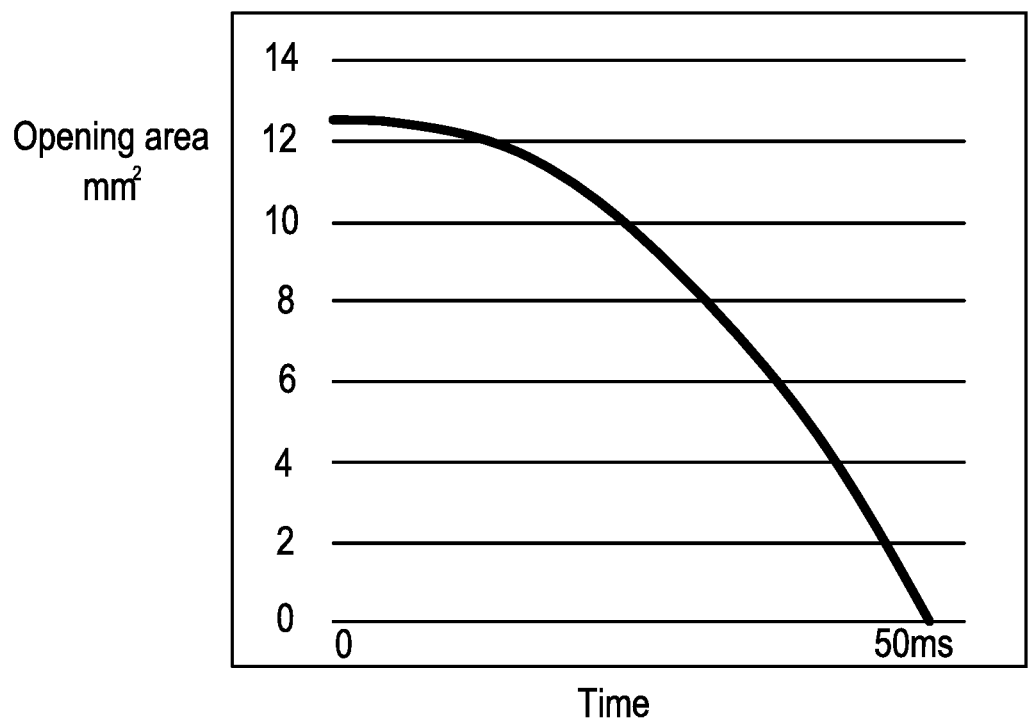
FIG. 13 is a graph illustrating change in the opening area as a sheet skewing at an angle of 45° to the right with respect to the conveyance direction passes through the opening according to one or more embodiments of the present invention.

FIG. 12 illustrates a state in which a sheet skews while being tilted to the right by 45° for l=5 mm and v=100 mm/s, and illustrates a case with θ=45°, l=5 mm, and v=100 mm/s. In FIG. 12, a slanting line indicates the position of the leading end of the sheet at each 10 ms. FIG. 13 is a graph illustrating the relation between time and the opening area.

In the example illustrated in FIG. 12, the leading end of the sheet simultaneously reaches at the apex A and the apex B after reaching at the apex C. Accordingly, the continuation time of change in the amount of received light is same (50 ms) as that in a case of a sheet without skewing, but change in the amount of received light exhibits an upwardly convex graph. Thus, the skew angle of a sheet can be calculated based on a signal output from the light receiving element.

When T2 represents the continuation time of an output from the light receiving element, l represents the length of each of the right-angled sides of the triangle of the opening, v represents the conveyance speed of a sheet, and θ represents the tilt angle of the sheet, the relation between the time T2 and the angle θ is expressed by the following formula.

$$T2=l/v\times\tan\theta \quad (3)$$

Thus, the tilt angle θ of the sheet can be calculated by substituting the continuation time T2 into Formula (3) above.

For example, when the skew angle is smaller than 45°, the leading end of a sheet passes through the apex C, the apex A, and the apex B in this order. A time equal to that in a case of a sheet being not tilted elapses until the sheet entirely covers the transmissive part since the leading end of the sheet reaches at the transmissive part, but temporal change in the opening area of the opening differs. Thus, the skew angle can be calculated based on information related to the rate of temporal change in the amount of received light and the rate of temporal change in the amount of received light.

For example, a graph representing the relation between change in the opening area of the opening and time is upwardly convex in a duration since the leading end of a sheet reaches at the apex C until the leading end of the sheet reaches at the apex A, and the graph is downwardly convex in a duration since the leading end of a sheet reaches at the apex A until the leading end of the sheet reaches at the apex B. A time in which the graph switches from the upwardly convex shape to the downwardly convex shape depends on the skew angle of a sheet. The skew angle of a sheet can be calculated based on the second order differential of the output from the light receiving element. For example, the skew angle of a sheet can be calculated by Formula (3) based on a time in which a graph of the output from the light receiving element switches from an upwardly convex shape to a downwardly convex shape (the second order differential becomes zero). Alternatively, the skew angle may be calculated by using another formula in accordance with temporal change in the amount of received light since the leading end of the sheet reaches at the apex A until the leading end of the sheet reaches at the apex B.

It is thought that there is no need to consider a case in which the skew angle exceeds 45°.

Figure 14:
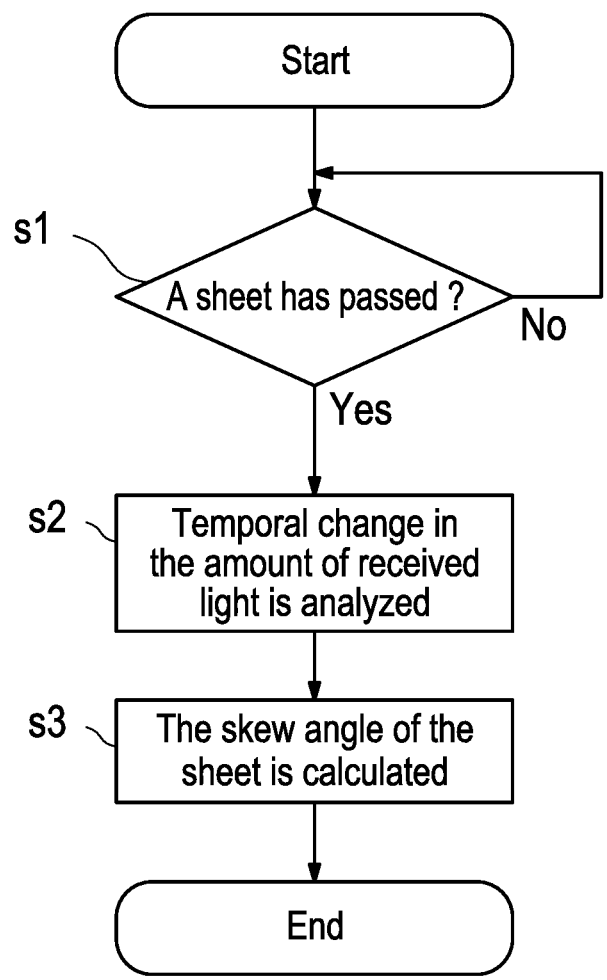
FIG. 14 is a flowchart illustrating a procedure of calculating a skew angle of a sheet according to one or more embodiments of the present invention.
Figure 15:
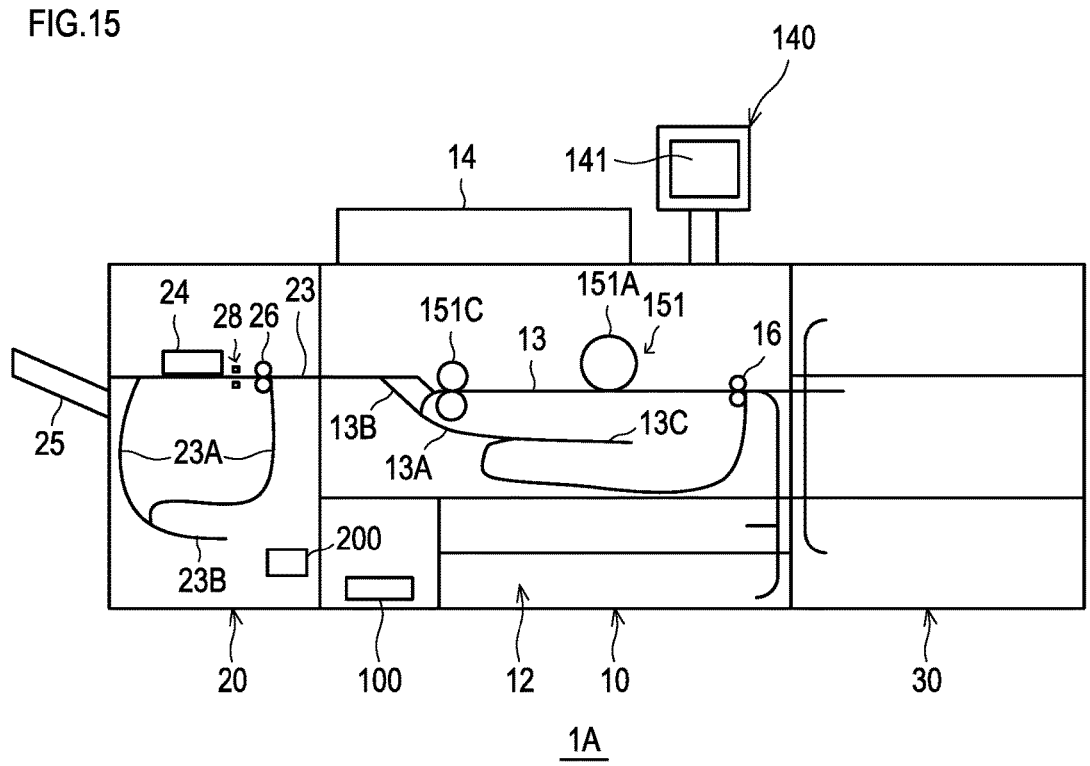
FIG. 15 is a diagram schematically illustrating a mechanical configuration of an image forming device as an image processing apparatus according to one or more embodiments of the present invention.

The following describes, with reference to a flowchart illustrated in FIG. 14, a procedure of detecting the skew angle of a sheet based on the amount of light received by the light receiving element 18B. The following operation is executed through control by the control unit having received an output from the light receiving element.

When sheet conveyance is started at image formation, it is determined whether a sheet has passed through the sensor 18 (step s1). Whether a sheet has passed through the sensor 18 can be determined based on change in the amount of light received by the light receiving element 18B of the sensor 18. It can be determined that the sheet has passed through the sensor 18 when the amount of received light changes to zero and then returns. The procedure may transition to the next step at the timing when the amount of received light changes to zero.

When no sheet has passed through the sensor 18 (step s1, No), the procedure waits for passing of a sheet.

When a sheet has passed through the sensor 18 (step s1, Yes), temporal change in the amount of received light is analyzed (step s2), and the skew angle of the sheet is calculated based on the temporal change in the amount of received light (step s3). The calculation of the skew angle of the sheet can be performed based on the time of change in an output from the light receiving element and the rate of temporal change as described above. Once the skew angle is calculated, the procedure ends.

The calculation of the skew angle may be performed based on the above-described formula. Alternatively, the amount of received light and the skew angle of a sheet may be stored in association with each other in a table or the like in advance, and the skew angle of a sheet may be calculated by referring to the table after the analysis of the output from the light receiving element 18B.

Although the skew angle at the leading end of a sheet is sensed in the above-described operation, the skew angle of the sheet may be detected at the rear end of the sheet so that a skew of the sheet is detected based on the difference between the angle at the leading end of the sheet and the angle at the rear end thereof. An image can be corrected by performing trapezoid correction in accordance with the skew of the sheet.

According to the above embodiments, the skew angle of a sheet can be sensed by one sensor only, which leads to cost reduction. In addition, the sensor can be disposed on an extended line of the conveyance roller, thereby improving the accuracy of sensing the skew angle. However, the present invention is not limited to a particular number of sensors, but is applicable to an appropriate number of sensors. In addition to a sensor according to the above embodiments of the present invention, a conventional sensor including no shielding unit may be provided separately from the sensor according to one or more embodiments of the present invention.

The control unit 100 can perform angle adjustment of an image based on a calculated angle, and can correct the skew angle of a sheet based on the calculated skew angle. The correction of the skew angle is not limited to a particular method, but can be performed by using a mechanism such as a resist roller or a guide. The timing of image formation can be accurately determined by the correction.

In the above description, the skew determination is performed on a sheet on which an image is yet to be formed. However, at reading of a printed sheet, the accuracy of reading an image can be improved by determining skewing of the sheet.

An image forming device 1A according to one or more embodiments of the present invention has a configuration in which the device body 10 is connected with a reading device 20. The device body 10 and the feeding device 30 have configurations same as those in the above embodiments except that the device body 10 does not include a sensor according to the above embodiments of the present invention, and thus description thereof will be omitted.

The reading device 20 includes a conveyance path 23. The conveyance path 23 has an upstream side connected with the conveyance path 13 of the device body 10. This configuration allows inputting of a sheet conveyed from the device body 10. Sheet conveyance through the conveyance path 23 is performed by a conveyance roller 26 provided along the conveyance path 23.

The conveyance path 23 is provided with a sensor 28 capable of sensing the leading end of a sheet being conveyed. The sensor 28 is positioned downstream of the conveyance roller 26 in the conveyance direction. The sensor 28 has a configuration same as that of the sensor 18 of the device body 10, and can sense the leading end of the sheet and the skew angle of the sheet based on change in the amount of light received by the light receiving element. When the leading end is sensed, information is transmitted to an image reading unit 24. An image is read by the image reading unit 24 based on the information on the leading end of the sheet.

The conveyance path 23 is provided with the image reading unit 24 downstream of the sensor 28. The image reading unit 24 includes a line sensor such as a CMOS sensor, and can read an image on the sheet by performing, at each line along the width of the sheet, scanning in a direction in which the sheet proceeds.

An inversion conveyance path 23A bifurcates from the conveyance path 23 downstream of the image reading unit 24. The inversion conveyance path 23A includes an inversion part 23B. The inversion conveyance path 23A has a downstream side joined with the conveyance path 23 upstream of the sensor 28 on the conveyance path 23.

When reading is to be performed on the back surface of a sheet, the sheet is transferred to the inversion conveyance path 23A, temporarily transferred to the inversion part 23B, and then conveyed onto the conveyance path 23 upstream of the sensor 28 through the inversion conveyance path 23A. Thereafter, the leading end of the sheet is sensed by the sensor 28, and the sheet is read based on position information of the leading end. The read sheet is discharged to a discharging tray 25.

Figure 16:
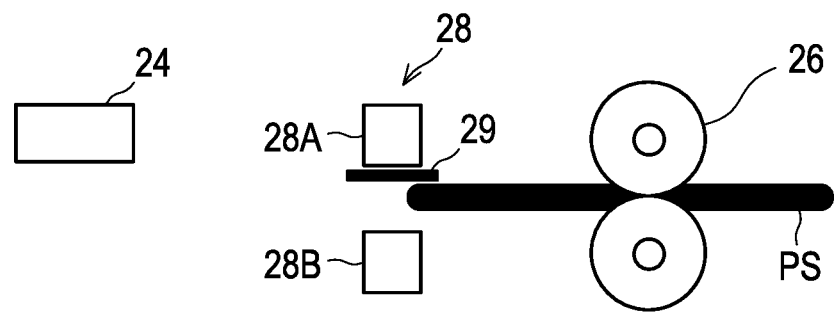
FIG. 16 is a side view of the vicinity of the sensor according to one or more embodiments of the present invention.

As illustrated in FIG. 16, the sensor 28 includes a light emitting element 28A positioned above the conveyance path 23, and a light receiving element 28B positioned below the conveyance path 23. The light receiving element 28B is provided at a position facing to the light emitting element 28A. In the sensor 28, sensing light output from the light emitting element 28A is received by the light receiving element 28B. The light receiving element 28B outputs an electric signal in accordance with the amount of the received light in an analog manner. The light emitting element corresponds to the light emitter according to one or more embodiments of the present invention, and the light receiving element corresponds to the light receiver according to one or more embodiments of the present invention.

As a sheet PS being conveyed passes between the light emitting element 28A and the light receiving element 28B of the sensor 28, the amount of received light of sensing light output from the light emitting element 28A and received by the light receiving element 28B changes, and an output from the light receiving element 28B changes accordingly. The leading end of the sheet being conveyed can be sensed based on the change in the output from the light receiving element 28B.

A shielding plate 29 is provided between the conveyance path 23 and the light emitting element 28A. Similarly to the shielding plate 19, the shielding plate 29 is a black plate having an opening (not illustrated) inside. Similarly to the opening 19A, the opening can have, for example, such a triangular or polygonal shape that an opening width in the direction orthogonal to a conveyance direction of a medium changes in the conveyance direction. The opening desirably has a shape asymmetric on the right and left sides with respect to the conveyance direction.

The reading device 20 includes a reading control unit 200. The reading control unit 200 includes a CPU and a computer program that operates on the CPU, and can control each component of the reading device 20.

The reading control unit 200 is connected with the sensor 28 in a controllable manner. In the sensor 28, by control of the reading control unit 200, the light emitting element emits sensing light, and the light receiving element outputs an analog signal based on the amount of received light. The analog signal is transmitted to the reading control unit 200. The reading control unit 200 transmits an acquisition result to the control unit of the device body 10. The control unit can perform determination of skewing of a sheet and calculation of the skew angle thereof. When a result of reading by the image reading unit 24 is transmitted to the control unit, a read image can be corrected by the control unit.

Unlike the above-described configuration, the reading control unit 200 may perform sensing of the leading end of a sheet based on an output from the sensor 28, and determination of skewing of the sheet. The reading control unit 200 can correct read image data based on a calculated skew angle. For example, the reading control unit 200 can correct the read image data based on the skew angle of the sheet and correct the angle of the sheet before image reading. In addition, a skew of the sheet can be detected based on the skew angle of the sheet at the leading end and the skew angle of the sheet at the rear end, and the read image data can be corrected based on the skew. The correction of read image data based on the skew is not limited to a particular method. For example, trapezoid correction may be performed on a read image.

In the above-described control, the reading control unit functions as a controller according to one or more embodiments of the present invention.

The reading device 20 is connected with the device body in one or more embodiments of the present invention, but may be provided alone without being connected with the device body, or may be connected with the image forming device as a separate device. In these cases, the reading device 20 corresponds to the image processing apparatus according to one or more embodiments of the present invention.

The image processing apparatus according to one or more embodiments of the present invention is applicable as a document reading unit used to read a document. The document reading unit may be provided with a sensor to determine skewing of a sheet before document reading and, for example, correction of a read image and angle correction of the sheet based on a result of the determination may be performed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus, comprising:
   a conveyance roller that conveys a medium relating to image processing along a conveyance path;
   a sensor that senses the medium conveyed along the conveyance path; and
   a controller that controls the conveyance roller and acquires a result of the sensing executed by the sensor, wherein
   the sensor includes:
      a light emitter;
      a light receiver that receives sensing light output from the light emitter and executes output in accordance with the amount of the received light; and
      a shield including a transmissive part through which the sensing light transmits, the light being output from the light emitter and reaching at the light receiver,
   the transmissive part has a shape in which an opening width in a direction orthogonal to a conveyance direction of the medium changes in the conveyance direction,
   the shield is disposed at a position between the light emitter and the light receiver at which the medium conveyed along the conveyance path passes along the transmissive part, and
   the controller determines skewing of the medium being conveyed based on change in the amount of light received by the light receiver as the medium passes along the transmissive part and temporal change in accordance with the conveyance of the medium.

2. The image processing apparatus according to claim 1, wherein the transmissive part has a shape that is asymmetric on right and left sides with respect to the conveyance direction.

3. The image processing apparatus according to claim 1, wherein the transmissive part has a polygonal shape.

4. The image processing apparatus according to claim 3, wherein the transmissive part is shaped in a triangle having one apex on a downstream side in the conveyance direction and a base aligned with the direction orthogonal to the conveyance direction.

5. The image processing apparatus according to claim 4, wherein the triangle is a right triangle and a side orthogonal to the base is aligned with the conveyance direction.

6. The image processing apparatus according to claim 1, wherein
   the conveyance roller is positioned near the shield, and
   the transmissive part is positioned downstream of the conveyance roller in the conveyance direction.

7. The image processing apparatus according to claim 1, wherein the controller obtains, based on a predetermined relation or by calculation, a skew angle of the medium being conveyed based on the change in the amount of received light, which is output from the light receiver as the medium passes along the transmissive part, and the temporal change in accordance with the conveyance of the medium.

8. The image processing apparatus according to claim 7, wherein
   the medium is a recording medium on which an image is to be formed,
   the image processing apparatus further includes an image former that executes image formation on the recording medium, and
   the controller executes, based on at least one of an acquired skew angle of the medium, angle adjustment of the medium and image adjustment at the image formation unit.

9. The image processing apparatus according to claim 8, wherein the controller detects a skew of the medium being conveyed based on a difference between a skew angle of the medium acquired at a leading end of the medium and a skew angle of the medium acquired at a rear end of the medium, and executes trapezoid correction as image adjustment.

10. The image processing apparatus according to claim 7, wherein
- the medium is a document medium on which a document is printed,
- the image processing apparatus further includes a document reader that reads an image of the document medium, and
- the controller executes, based on at least one of an acquired skew angle of the medium, angle adjustment of the medium and image adjustment of a result of the reading at the document reader.

\* \* \* \* \*